United States Patent [19]
Wallace et al.

[11] Patent Number: 5,643,353
[45] Date of Patent: Jul. 1, 1997

[54] CONTROLLING DEPOLING AND AGING OF PIEZOELECTRIC TRANSDUCERS

[75] Inventors: David B. Wallace, Dallas; Ronald E. Marusak, Richardson, both of Tex.

[73] Assignee: Microfab Technologies, Inc., Plano, Tex.

[21] Appl. No.: 251,409

[22] Filed: May 31, 1994

[51] Int. Cl.⁶ ............................................. B22D 39/00
[52] U.S. Cl. ................... 75/331; 222/590; 222/593; 266/239
[58] Field of Search ..................... 222/590, 591, 222/593; 266/202, 236, 239, 78; 75/331; 347/68

[56] References Cited

U.S. PATENT DOCUMENTS

| | | | |
|---|---|---|---|
| 3,833,163 | 9/1974 | Denslow et al. | 228/1 |
| 4,828,886 | 5/1989 | Heiber | 427/422 |
| 5,229,016 | 7/1993 | Hayes et al. | 222/590 |
| 5,377,902 | 1/1995 | Hayes | 222/590 |
| 5,415,679 | 5/1995 | Wallace | 222/590 |
| 5,431,315 | 7/1995 | Chun et al. | 222/590 |

*Primary Examiner*—Scott Kastler
*Attorney, Agent, or Firm*—Harris, Tucker & Hardin, P.C.

[57] ABSTRACT

Depoling and aging of a piezoelectric transducers used at elevated temperatures is controlled by poling the transducer, applying a bias voltage in the same direction as the transducer is poled to maintain the piezoelectric transducer at an elevated potential, and applying a drive voltage having a lesser magnitude than the bias voltage to induce elastic strain in the transducer.

23 Claims, 3 Drawing Sheets

CONTROLLING DEPOLING AND AGING OF PIEZOELECTRIC TRANSDUCERS

This invention relates generally to dispensing liquids at elevated temperatures using piezoelectric actuated ink-jet devices. More particularly, but not by way of limitation, it relates to methods and apparatus for controlling the depoling and aging effects on piezoelectric transducers when such transducers are subjected to high temperatures associated with dispensing of liquids, such as molten solder, at elevated temperatures.

Soldering is extensively used in circuit boards and electronic devices to provide electrical connections. The trend in electronics and circuitry is toward miniaturization resulting in smaller leads and connections. Additionally, the number of connections has increased. As device package sizes decrease and the number of input/output leads increases, the size of individual leads and spacing therebetween must be reduced, leading to difficulties in positioning and securing the leads on mounting pads on the surfaces of circuit boards and the like.

It is highly desirable to employ ink-jet technology to provide a less expensive and accurate way of depositing microdroplets of solder on a circuit board, electronic package, semi-conductor chip or the like. Such applications of molten solder droplets using ink-jet technology have been discussed in IBM Technical disclosure Bulletin, Vol.14, No. 8, January 1972, pp. 2352–2355; Hieber, U.S. Pat. No. 4,828,886; Hayes, U.S. Pat. No. 5,193,738; and Hayes, et al., U.S. Pat. No. 5,229,016.

The Hieber, Hayes and Hayes, et al. patents disclose piezoelectric transducers as means for propelling a droplet from a dispensing device or as means for creating a disturbance which causes a pressurized stream of molten solder to break into droplets. However, piezoelectric materials have limitations. Temperatures required to form molten solder balls range from approximately 100° C. to approximately 350° C. and tend to be close to the Curie temperature of the piezoelectric material. Operation at these temperatures can cause the piezoelectric characteristics of the material to change.

Conventional drive waveforms make piezoelectric materials not well suited for operating at these temperatures because (1) near the Curie temperature of a given piezoelectric material, the properties change drastically and (2) at temperatures well below the Curie temperature, the normal aging process characteristic of piezoelectric materials is accelerated drastically. Aging is the gradual decrease in the piezoelectric properties typical of piezoelectric material after it has been poled. The latter effectively limits the use of piezoelectric materials to more than 100°–200° C. below the Curie temperature. Many desirable piezoelectric materials have low Curie temperatures in order to increase their piezoelectric properties.

Piezoelectric materials, the most useful of which are ceramics, are those in which the dipole moments of the crystal domains can be semi-permanently oriented by applying a large electric field across the material. This process is referred to as poling. The "direction" of the field is determined by the physical placement of the positive and negative voltages. After poling, if an electric field is applied with the same polarity as the original poling field, the material will expand along a line parallel with the field. Conversely, if a field of opposite polarity is applied, the material will contract along a line parallel with the field. The magnitude of change in shape per unit electric field of a poled piezoelectric material is quantified in its piezoelectric properties.

Application of electric fields with the same polarity as the original poling field will not affect the piezoelectric properties. However, if a sufficiently high electric is applied to the material, the dipole moments of the material will become disoriented, and the piezoelectric properties decreases with increasing temperature.

Poling creates a semi-permanent orientation because the dipole moments of the crystal domains will slowly relax over time to the original disoriented state. Elevated temperature and application of fields with a polarity opposite to that of the original poling field will accelerate this process. Combining the two effects drastically increases the rate of relaxation. Heating the material to the Curie temperature will cause immediate disorientation of the domains.

As illustrated in FIGS. 1 and 2, surface mountable packages such as microelectronic device package 10 (a semiconductor integrated circuit chip or the like) is operatively joined to a substrate such as a printed circuit board or other device 12 by a solder reflow process. The interconnection material between the microelectronic device package 10 and the substrate or device 12 is in the form of a solder bump, drop, ball or deposit 14 formed prior to the solder reflow process.

Microelectronic device 10 (the upside-downchip or "flip chip") is then inverted (see FIG. 2) and the solder bumps 14 aligned with the correct matching footprint of solder-wettable terminals, contact pads or bond pads 18 on the substrate 12. Heat is then applied and all joints or interconnections between the wettable metal pads 16 on the microelectronic device 10 and the solder-wettable terminals, contact pads or bond pads 18 on the substrate 12 are made simultaneously by reflowing the solder in the solder bumps or drops 14. Typically, such interconnections are made with solder bumps 14 which are about 100 to 150 μm (microns) in diameter with several hundred to several thousand solder bumps per chip. Manufacturing processes, however, are moving toward more interconnections per chip and thus require smaller solder bumps. Since the interconnections are closer together, greater accuracy in placement of the solder bumps is also required. As disclosed in Hayes U.S. Pat. No. 5,193,738 and Hayes, et al. U.S. Pat. No. 5,229,016 ejection devices employing piezoelectric transducers can dispense molten solder quickly and accurately. However, at the elevated temperatures associated with molten solder, aging and depoling effects may seriously limit the use of piezoelectric materials. Control or elimination of such aging and depoling effects is thus highly desirable and necessary to permit extended use and reliable performance of piezoelectric transducers at elevated temperatures.

In accordance with the present invention, depoling and aging of piezoelectric transducers operating at elevated temperatures are controlled by poling the piezoelectric transducer, applying a bias voltage to the transducer so that an electric field of the same polarity as the poling field is created in the transducer when it is stationary, and modulating the voltage between the bias voltage and ground to actuate the transducer, causing the transducer to eject generally spherically shaped drops of fluids at elevated temperatures. Typical fluids which may be dispensed include molten solders, molten waxes, tacky fluxes operating above their phase change temperature, or any fluid which must be heated to lower its viscosity so that it may be dispensed by an ink-jet type device.

Using solder as an example, a typical apparatus employing the invention to form balls or droplets of solder comprise a holding reservoir to hold and maintain the solder in a liquid state, an ejection device having a piezoelectric transducer in communication with the reservoir to eject a generally spherical-shaped microdroplet of molten solder, and an excitation voltage source to cause the piezoelectric transducer to deform and eject a ball or droplet of molten solder. To control depoling and aging of the piezoelectric transducers operating at elevated temperatures, the apparatus of the invention includes a voltage source to apply a bias voltage to the piezoelectric transducer and an actuating drive voltage with a constant or varying frequency voltage waveform to cause the transducer to eject generally spherical-shaped molten solder droplets. Other features and advantages of the invention will become more readily understood from the following detailed description taken in connection with the appended claims and accompanying drawing, wherein like reference numerals have been applied to like elements, in which:

Figure 1:
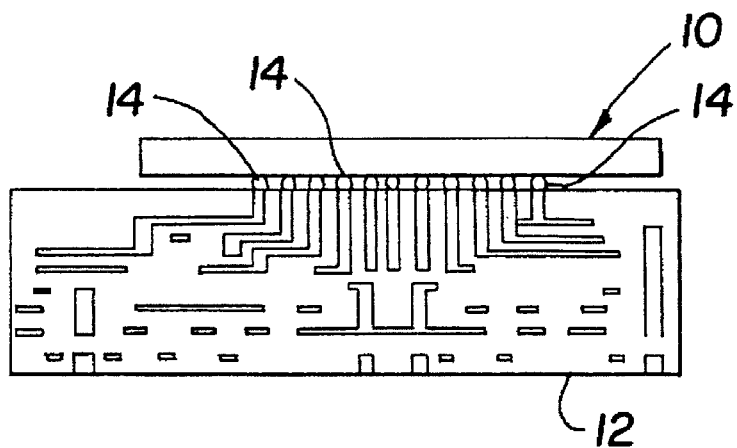
FIG. 1 is a simplified pictorial illustration of an integrated circuit chip bonded to a substrate.
Figure 2:
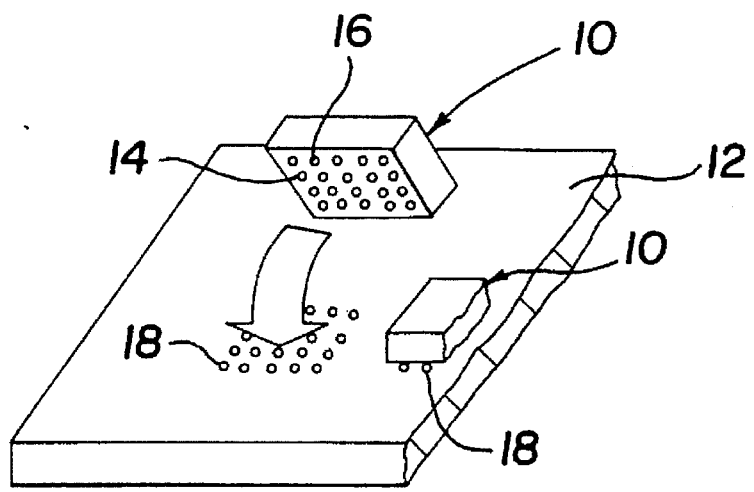
FIG. 2 is a simplified pictorial illustration of one step in the process of bonding of an integrated circuit chip to a substrate.
Figure 3:
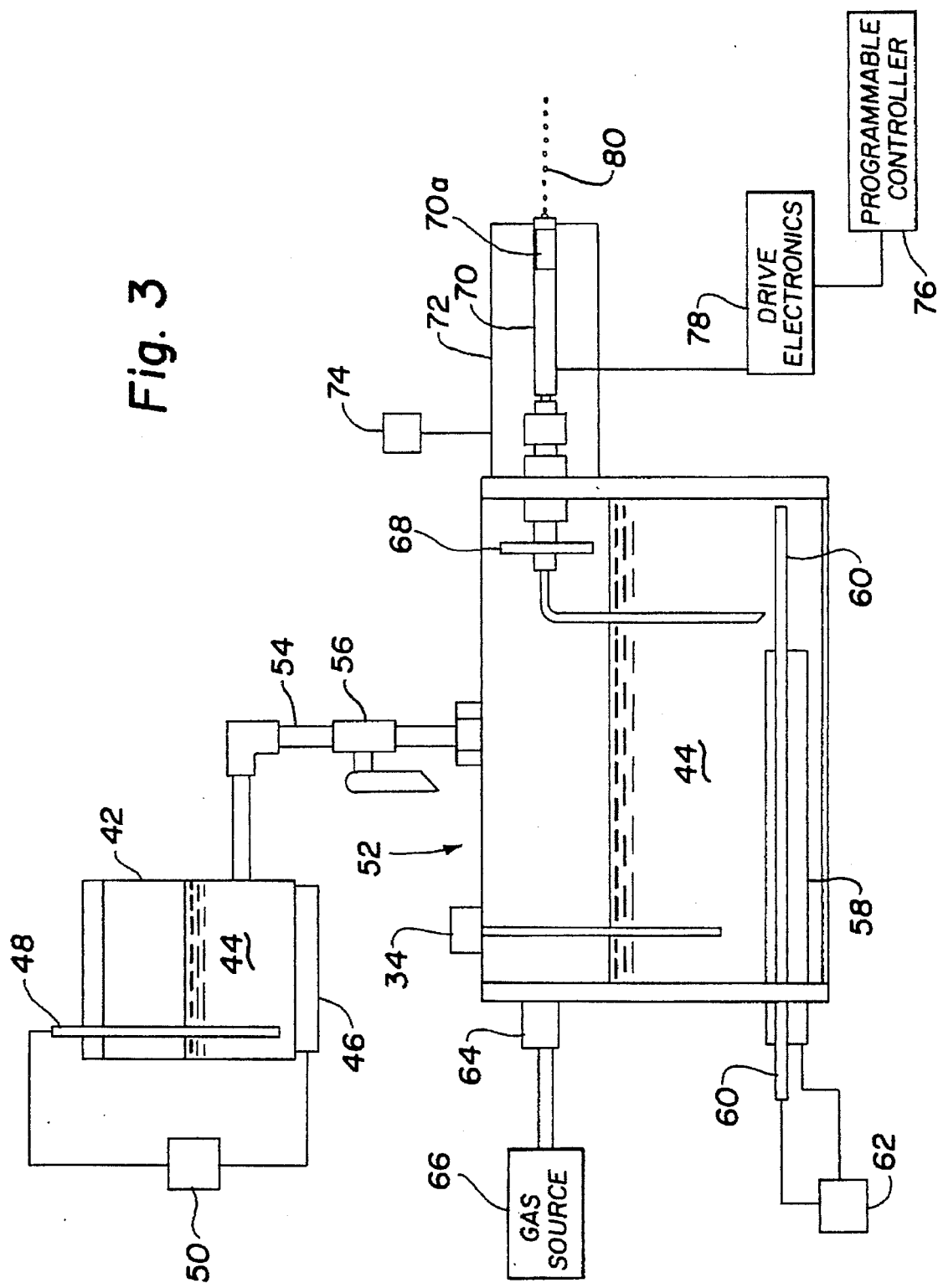
FIG. 3 is a schematic illustration of apparatus employing the preferred embodiment of the invention to dispense molten solder.

Solder ejecting apparatus employing one preferred embodiment of the invention is shown in FIG. 3 and generally designated by the reference character 40. The apparatus is capable of producing and ejecting spherically-shaped quantities of liquid solder in controlled amounts, the volume of each of which may be varied as desired. The spherically-shaped quantities are ejected with great accuracy to very small soldering areas or surfaces (such as wettable metal contact pads on integrated circuit chips and contact or bond pads on packaging substrates) to provide a desired pattern of solder bumps or drops of different shapes and heights. As illustrated, solder-ejecting apparatus 40 comprises a holding reservoir 42 for initially receiving and holding liquid solder 44. Heating element 46 is operatively positioned in holding reservoir 42 to maintain the solder 44 in the liquid state. Thermocouple 48 is operatively connected to control power source 50 which heats the solder 44 and maintains it at the required temperature.

An ejection chamber 52 is connected to the outlet of reservoir 42 through conduit 54 and valve 56 which allows liquid solder 44 to flow from the reservoir 42 into ejection chamber 52. Oxides and impurities tend to stay at the top of the liquid solder 44 in the reservoir 42 and do not enter the ejection chamber 52. Heating element 58 is operatively positioned in ejection chamber 52 to maintain the solder 44 in the liquid state. Thermocouple 60 is connected to control power source 62 so that solder 44 will be maintained at the required temperature. For a charge-and-deflection device, ejection chamber 52 is pressurized through inlet port 64 by an inert gas such as argon from gas source 66. The pressurized gas forces liquid solder 44 through filter 68 into the ejection device 70 to purge the system in preparation for operation. In the drop-on-demand ejection device 70, the ejection chamber 52 is not pressurized during operation. However, the space above the liquid solder 44 is filled with a relatively inert gas from gas source 66 to eliminate oxygen from the chamber.

Heater 72, operatively connected to power source 74, surrounds the ejection device 70 and controls the temperature of the liquid solder 44 within the ejection device 70. Ejection device 70 is a transducer which converts an applied electric field to a mechanical strain in the transducer 70. Programmable controller 76 provides activating signals to drive electronics 78 and causes drive electronics to apply a bias voltage and drive voltage to the transducer 70. The bias voltage induces a bias electric field in the transducer which causes the transducer 70 to have an elevated electric potential. The drive voltage induces a drive electric field in the transducer 70 which causes ejection device transducer 70 to eject a drop or drops 80 of liquid solder 44 in a manner controlled by the particular program in programmable controller 76. Changes in the magnitude of the drive voltage applied to the ejection device 70 are used to change the size of the drops 80 of liquid solder 44.

The space surrounding drops 80 of liquid solder 44 between ejection device 70 and the target is preferably filled with relatively inert gas to eliminate oxygen from the path traveled by the drops 80. A gas source 62 provides a flow of inert gas into the space traveled by the drops 80 and the area where the drops 80 land on the target.

Operation of the apparatus 40 begins with placing solder in reservoir 42. In a preferred embodiment, the solder comprises a eutectic of at least two of the elements lead, tin, bismuth and indium. One such solder alloy is 63/57 tin/lead. Power is applied to heating element 46 to bring the temperature of the solder to its melting point. After the solder is melted in the reservoir 42, a portion thereof is transferred through conduit 54 and valve 56 to the ejection chamber 52 where the solder 44 is maintained liquid by heating element 58. Ejection chamber 52 may be pressurized with relatively inert gas such as nitrogen or argon at a pressure of from about ten (10) to about thirty (30) psi, depending on whether a drop-on-demand ejection device or a charge and deflection type device is desired. The pressurized gas forces liquid solder 44 through filter 48 and into ejection device 70. Ejection device 70 is excited with signals from drive electronics 78 having a frequency typically less than about ten thousand (10,000) Hz.

Figure 4:
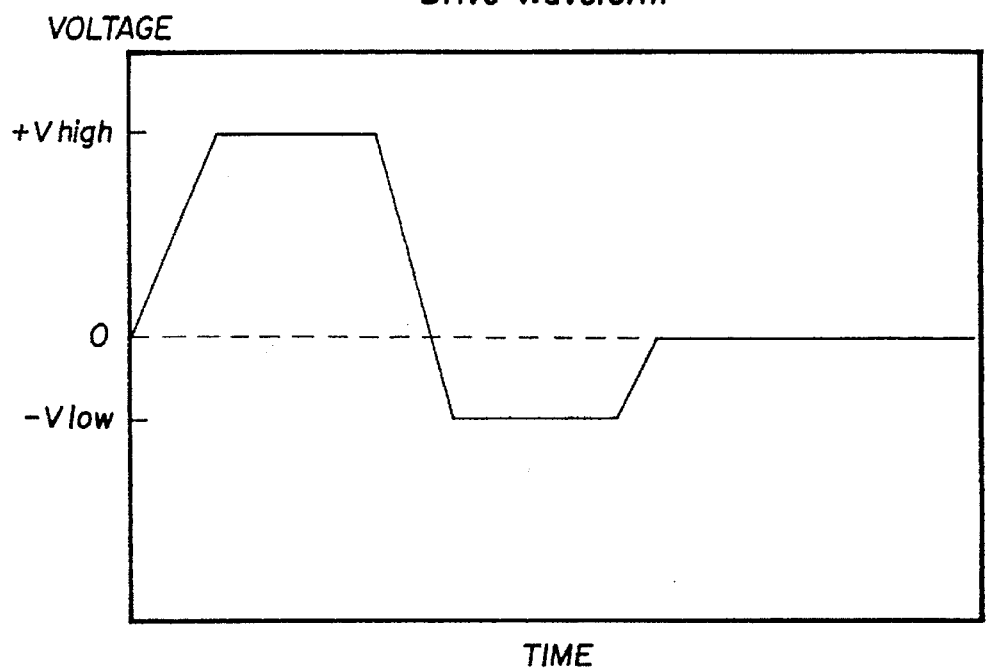
FIG. 4 is a graph of a conventional piezoelectric drive waveform which modulates about a zero electric potential from a maximum positive voltage to a minimum negative voltage.
Figure 5:
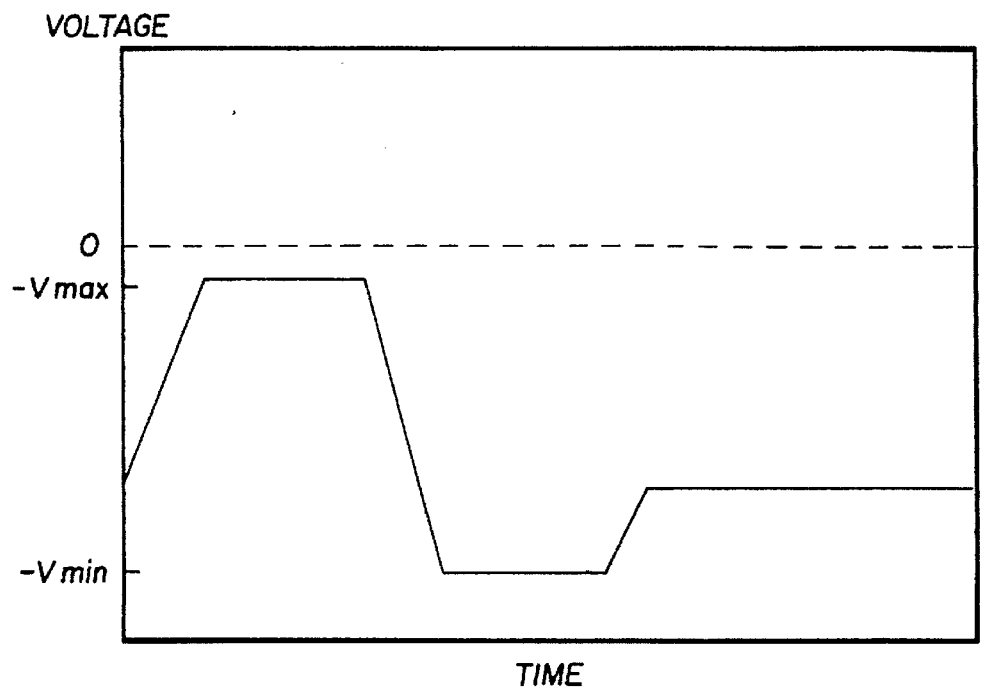
FIG. 5 is a graph of a biased piezoelectric drive waveform which modulates below the zero electric potential about a bias voltage from a maximum voltage to a minimum voltage.

In a preferred embodiment, the ejection device 70 comprises a piezoelectric transducer 70 which ejects liquid solder in response to an excitation signal. Piezoelectric transducers expand and contract mechanically when an electric field is applied. The type of motion (expansion or contraction) is dependent on the polarity of the field. However, when piezoelectric materials are subjected to temperatures even 100°–200° below the Curie temperature of the material, for instance 200° C. for 63/37 tin/lead solder and 365° C. for Morgan matrox PZT-5A piezoelectric material, piezoelectric materials may lose their polarization. To avoid the above described limitations, the piezoelectric transducer 70 is poled when it is fabricated and, in operation, a bias voltage which creates an electric field is applied by the drive electronics 78. Once biased at the elevated potential, a drive voltage (also supplied by the drive electronics 78) is applied to cause the transducer 70 to contract, thereby ejecting generally spherically-shaped molten solder droplets. Preferably, the magnitude of the drive voltage is less than or equal to the bias voltage. It should be noted that the drive voltage can be an impulse or a constant or a varying frequency waveform, such as a sinusoidal waveform. Examples of a conventional drive waveform and a biased piezoelectric drive waveform are illustrated in FIGS. 4 and 5. The graph in FIG. 4 illustrates how a conventional waveform causes the transducer to become depoled by modulating the voltage about a zero potential with a maximum voltage, Vhigh, and a minimum voltage, Vlow. As the voltage varies from Vhigh to Vlow and passes through the zero electric potential, the electric field's polarity varies from a positive electric field to a negative electric field which cause the transducer to become depoled. By providing a bias voltage in the biased drive waveform and modulating the applied drive voltage about the bias voltage rather than the zero potential, the polarity of the applied electric field does not change. Instead, the polarity of the applied electric field remains constant.

Control of the size of the solder bump is further achieved through changes in the drive voltage as bounded by an upper limit, the upper limit being defined as the point at which the drive voltage exceeds the bias voltage such that the net electric field of the two voltages changes the polarity of the transducer. Small changes in diameter (and volume) of the solder bump or ball 80 generally require only changes in the drive excitation voltage pulse. Large changes generally require changes in the size of the orifice in the ejection device 70.

Although the invention has been described with particular reference to presently preferred embodiments thereof, various modifications, alterations, variations, etc., may be made without departing from the spirit and scope of the invention as defined by the appended claims.

What is claimed:

1. The method of controlling depoling and aging of a piezoelectric transducer operating at elevated temperatures comprising the steps of:
   (a) poling a piezoelectric transducer by applying a first electric field having a first polarity;
   (b) applying a bias electric field having the same polarity as said first electric field; and
   (c) applying a drive electric field which induces elastic strain in the piezoelectric transducer.

2. The method set forth in claim 1 wherein the step of applying a drive electric field includes applying an electric field with an opposite polarity to that of the bias electric field.

3. The method set forth in claim 2 wherein the step of applying a bias electric field comprises applying a bias electric field of greater magnitude than the maximum applied drive electric field.

4. The method set forth in claim 1 wherein the step of applying a drive electric field includes the step of applying a constant frequency voltage waveform.

5. The method set forth in claim 1 wherein the step of applying a drive electric field includes the step of applying a sinusoidal voltage waveform.

6. The method of controlling depoling and aging of a piezoelectric transducer used for ejecting liquid at elevated temperatures comprising the steps of:
   (a) heating a liquid in a reservoir;
   (b) providing a piezoelectric transducer ejection device for ejecting liquid from the ejection device in response to an applied electric field;
   (c) transferring heated liquid from the reservoir to the ejection device;
   (d) poling the piezoelectric transducer with a first electric field having a first polarity;
   (e) applying a bias electric field with the same polarity as said first electric field; and
   (f) applying a drive electric field which induces elastic strain in the piezoelectric transducer causing the ejection device to eject heated liquid.

7. The method set forth in claim 6 further including the step of pressurizing said ejection device.

8. The method set forth in claim 6 wherein the step of applying a drive electric field includes applying an electric field with an opposite polarity to that of the bias electric field.

9. The method set forth in claim 8 wherein the step of applying a bias electric field comprises applying a bias electric field of greater magnitude than the maximum applied drive electric field.

10. The method set forth in claim 6 wherein the step of applying a drive electric field includes applying a constant frequency drive voltage.

11. The method set forth in claim 6 wherein the step of applying a drive electric field includes applying a sinusoidal drive voltage.

12. Apparatus for dispensing a hot liquid comprising:
   (a) a reservoir for holding hot liquid to be ejected;
   (b) an ejection chamber in communication with said reservoir for receiving and ejecting the hot liquid in response to an applied electric field, said ejection chamber having an orifice through which the liquid is ejected; and
   (c) a voltage source to apply a bias electric field to said ejection device and to apply a drive electric field to said ejection device to induce said ejection device to eject a liquid drop.

13. Apparatus as defined in claim 12 further including means to pressurize said ejection chamber.

14. Apparatus as defined in claim 12 wherein said ejection chamber comprises a piezoelectric transducer.

15. Apparatus as defined in claim 12 wherein said liquid includes molten solder and said apparatus further includes means for maintaining said molten solder in the liquid state in the apparatus.

16. Apparatus as defined in claim 12 wherein said voltage source is configured to apply said drive electric field as an impulse voltage.

17. Apparatus as defined in claim 12 wherein said voltage source is configured to apply said drive electric field as a sinusoidal voltage.

18. Apparatus for controlling depoling and aging of a piezoelectric transducer used as an ejection device for forming and ejecting microdroplets of liquid solder comprising:
   (a) a reservoir for holding molten solder, said reservoir further including means for maintaining said solder liquid;
   (b) a conduit in communication with said reservoir for receiving the molten solder;
   (c) an ejection chamber comprising a piezoelectric transducer with chamber in communication with said conduit for receiving and ejecting said molten solder in response to an applied electric field, said ejection chamber having means to maintain the molten solder in liquid state and said transducer having an orifice through which said molten solder is ejected; and
   (d) a voltage source for applying a bias voltage which produces a first electric field to maintain said piezoelectric transducer at an elevated electric potential and a drive voltage for selectively applying a drive electric field to said transducer to induce said transducer to eject a molten solder microdroplet.

19. Apparatus as defined in claim 18 further including means for pressurizing said ejection chamber.

20. Apparatus as defined in claim 18 wherein said drive voltage supplies an electric field having a greater magnitude than the electric field supplied by said bias voltage.

21. Apparatus as defined in claim 18 wherein said voltage source is configured to apply said drive voltage as a sinusoidal waveform.

22. Apparatus for controlling depoling and aging of a piezoelectric transducer used as an ejection device for forming and ejecting microdroplets of molten solder comprising:

(a) a reservoir for holding molten solder;

(b) means for maintaining said molten solder in liquid state in said reservoir;

(c) an ejection chamber in communication with said reservoir for receiving and ejecting said molten solder in response to an applied electric field, said chamber including means to maintain the solder in the liquid state in said chamber and a piezoelectric transducer having an orifice through which said molten solder is ejected;

(d) means for pressurizing said ejection chamber; and (e) a power source for generating a bias electric field to maintain said transducer at an elevated electric potential, said bias electric field having a constant magnitude, and for selectively applying a drive electric field to said transducer to induce said transducer to eject a molten solder drop, said drive electric field having a magnitude less than the magnitude of said bias electric field.

23. Apparatus for dispensing molten solder as defined in claim 22 wherein said power source is configured to generate said drive electric filed at a constant frequency.

* * * * *

UNITED STATES PATENT AND TRADEMARK OFFICE
CERTIFICATE OF CORRECTION

PATENT NO. : 5,643,353
DATED : July 1, 1997
INVENTOR(S) : David B. Wallace and Ronald E. Marusak It is certified that error appears in the above-indentified patent and that said Letters Patent is hereby corrected as shown below:

Claim 23, column 8, line 14, please change "filed" to --field--.

Signed and Sealed this

Sixteenth Day of December, 1997

Attest:

BRUCE LEHMAN

Attesting Officer

Commissioner of Patents and Trademarks